United States Patent [19]

Weber et al.

[11] 4,283,067
[45] Aug. 11, 1981

[54] PASSENGER MOTOR VEHICLE WITH A TANK ARRANGED BEHIND THE REAR SEATS

[75] Inventors: Andreas Weber, Lorch; Manfred Schaefer, Weinstadt, both of Fed. Rep. of Germany

[73] Assignee: Daimler-Benz Aktiengesellschaft, Stuttgart, Fed. Rep. of Germany

[21] Appl. No.: 91,762

[22] Filed: Nov. 6, 1979

[30] Foreign Application Priority Data

Nov. 15, 1978 [DE] Fed. Rep. of Germany ....... 2849485

[51] Int. Cl.³ .......................................... B60K 15/02
[52] U.S. Cl. ................................. 280/5 A; 180/54 A; 296/1 S
[58] Field of Search ............ 280/5 A, 5 R; 180/54 A; 296/1 S, 91, 195; 220/72

[56] References Cited

U.S. PATENT DOCUMENTS

| | | | |
|---|---|---|---|
| 1,218,708 | 3/1917 | Snell | 280/5 A |
| 1,683,841 | 9/1928 | Mullen et al. | 220/72 |
| 1,906,404 | 5/1933 | Page | 280/5 R |
| 1,979,191 | 10/1934 | Burney | 280/5 A |
| 3,067,829 | 12/1962 | Klemm | 180/5 A |
| 3,661,419 | 5/1972 | Mitamura | 280/5 A |

*Primary Examiner*—John A. Pekar
*Attorney, Agent, or Firm*—Craig and Antonelli

[57] ABSTRACT

A passenger motor vehicle with a fuel tank arranged to the rear of the rear seats within a space which is provided with inflow openings for dynamic air flow and/or with inflow openings for exhaust air out of the vehicle interior of motor vehicles equipped with an air-conditioning system, and with outflow openings to enable the discharge of air out of the fuel tank space.

7 Claims, 1 Drawing Figure

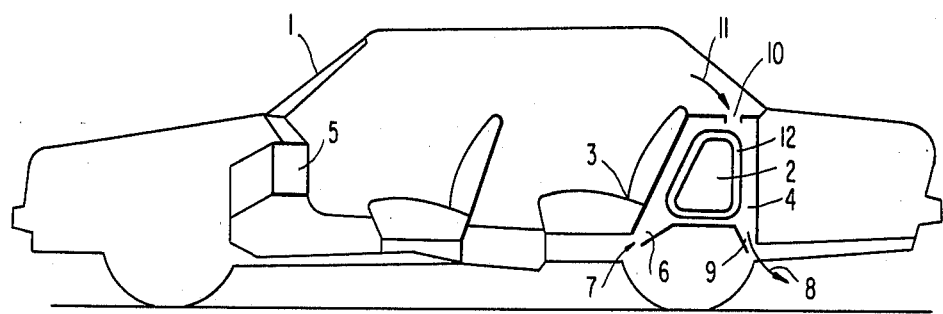

PASSENGER MOTOR VEHICLE WITH A TANK ARRANGED BEHIND THE REAR SEATS

The present invention relates to a passenger motor vehicle with a fuel tank arranged behind the rear seats, and is concerned with the task to eliminate the heating-up of the fuel observed with a fuel tank arrangement of this type by the fuel flowing back from the engine, which occurs in particular in hot countries and leads to a vapor bubble formation, commonly referred to as vapor lock, impairing or even interrupting the feed of fuel.

The underlying problems are solved according to the present invention in that the fuel tank is arranged in a space, which is provided with inflow openings for the dynamic air flow and/or in case of motor vehicles equipped with an air-conditioning system, with inflow openings for the discharge air out of the vehicle interior and with outflow openings.

One achieves by the present invention to remove from the fuel so much heat in a simple manner by way of driving or dynamic air flow and/or by cool discharge air out of the vehicle interior sweeping over the fuel tank that the fuel temperature remains below that critical temperature, at which a vapor bubble formation commences, i.e., vapor lock takes place. The heat removal can be further enhanced in that according to a further feature of the present invention, the fuel tank is provided with a ribbed construction.

Accordingly, it is an object of the present invention to provide a passenger motor vehicle with a fuel tank arranged behind the rear seats which eliminates by simple means the aforementioned shortcomings and drawbacks encountered in the prior art constructions.

Another object of the present invention resides in a passenger motor vehicle with a fuel tank arranged to the rear of the rear seats which effectively prevents vapor lock.

A further object of the present invention resides in a passenger motor vehicle with a fuel tank arranged to the rear of the rear seats which permits removal of so much heat from the fuel that the temperature thereof remains below the critical temperature leading to the beginning of vapor bubble formation.

Still another object of the present invention resides in a passenger motor vehicle of the type described above which permits the maintenance of the fuel temperature below certain critical temperatures by extremely simple means requiring essentially no additional mechanical parts.

These and other objects, features and advantages of the present invention will become more apparent from the following description when taken in connection with the accompanying drawing which shows, for purposes of illustration only, one embodiment in accordance with the present invention, and wherein:

The single FIGURE is a schematic longitudinal cross-sectional view through a motor vehicle equipped with a fuel tank arranged in accordance with the present invention.

Referring now to the single FIGURE of the drawing, reference numeral 1 designates a motor vehicle, in which for safety reasons the fuel tank 2 is arranged to the rear of the rear seats 3. In order to avoid that the temperature of the fuel in the fuel tank 2, as a result of fuel returned from the engine, reaches a temperature at which the formation of vapor bubbles commences, a separate space 4 is provided for the fuel tank 2, through which sweeps the dynamic air flow and/or exhaust air out of the vehicle interior—insofar as an air-conditioning installation 5 is provided in the vehicle—and thereby removes heat from the fuel tank 2. The feed of driving or dynamic air into the space 4 takes place in the direction of arrow 7 through an inflow opening or openings 6 disposed forwardly and in the bottom area of the space 4, whereas the discharge takes place in the direction of arrow 8 through the outflow opening or openings 9 which is or are arranged rearwardly in the bottom area of the space 4. In case an air-conditioning system 5 is provided in the motor vehicle, an inflow opening or openings 10 may be provided in the upper area of the space 4 for the utilization of the relatively cool exhaust air out of the vehicle interior for purposes of cooling the fuel tank 2 and then for purposes of cooling the fuel, through which the cooled exhaust air enters into the space 4 in the direction of arrow 11. In this case, the use of the dynamic air flow for cooling purposes may possibly be dispensed with and accordingly the inflow opening or openings 6 can be eliminated.

For purposes of enhancing the heat removal from the fuel tank 2, the surface thereof is enlarged in that ribs 12 are provided of any conventional construction.

While we have shown and described only one embodiment in accordance with the present invention, it is understood that the same is not limited thereto but is susceptible of numerous changes and modifications as known to those skilled in the art. For example, the present invention is, of course, also applicable to passenger motor vehicles in which only a single row of seats is provided or in which several, for example, three rows of seats are provided. Consequently, we do not wish to be limited to the details shown and described herein but intend to cover all such changes and modifications as are encompassed by the scope of the appended claims.

We claim:

1. A passenger motor vehicle which includes a seat means, an air conditioning system, and a fuel tank, characterized in that a space means is provided to a rear of the seat means for accommodating the fuel tank, first inflow opening means are provided for enabling an inflow of dynamic air produced by movement of the vehicle into the space means, second inflow opening means are provided for enabling an inflow of relatively cool exhaust air out of an interior space of the vehicle into the space means, and in that outflow opening means are provided for enabling a flow of air out of the space means so as to enable an air cooling of the fuel tank.

2. A passenger motor vehicle according to claim 1, characterized in that the first inflow opening means are located in a forward bottom area of said space means.

3. A passenger motor vehicle according to one of claims 1 or 3, characterized in that said second inflow opening means are located in a top portion of said space means.

4. A passenger motor vehicle according to claim 3, characterized in that the outflow opening means are located in a bottom rear area of the space means.

5. A passenger motor vehicle according to claim 4, characterized in that the fuel tank is provided with rib means for enlarging a cooling surface thereof.

6. A passenger motor vehicle according to one of claims 1 or 2, characterized in that the fuel tank is provided with rib means for enlarging a cooling surface thereof.

7. A passenger motor vehicle according to one of claims 1 or 2, characterized in that the outflow opening means are located in a bottom rear of the space means.

* * * * *